Figure 1:
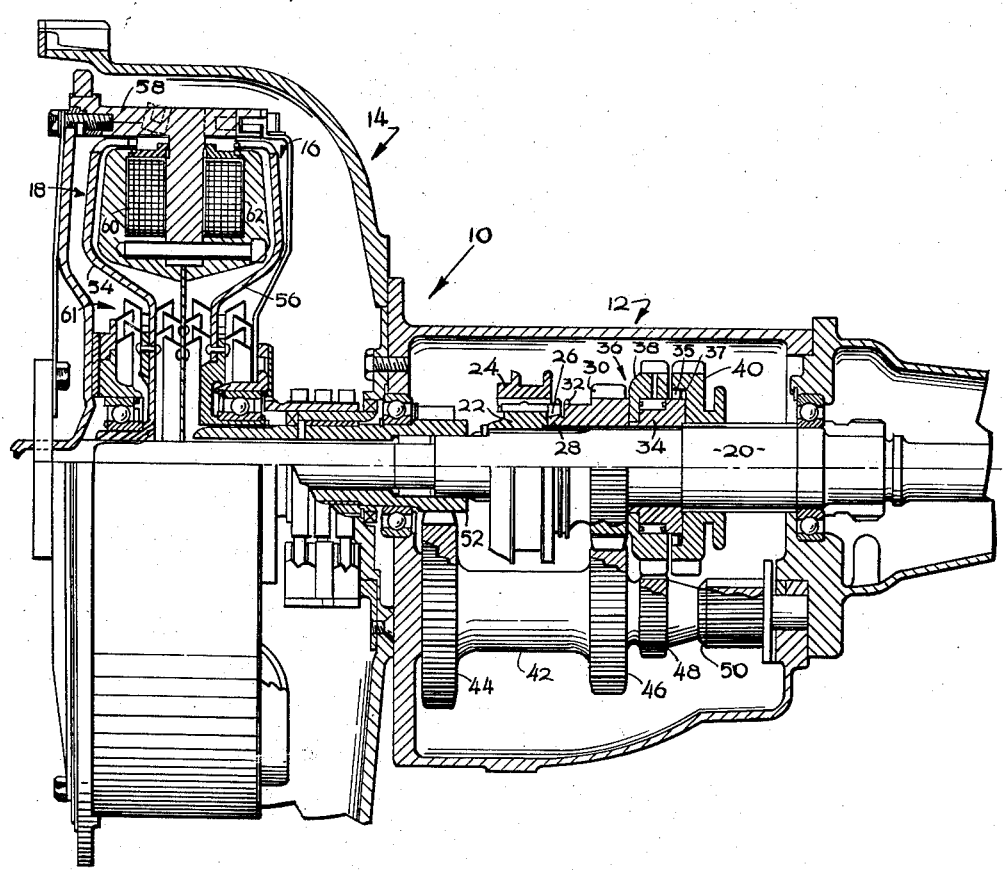

Nov. 24, 1959     A. S. GILL, JR     2,913,918
AUTOMATIC TRANSMISSION AND CONTROL

Filed Aug. 24, 1954     2 Sheets-Sheet 1

*INVENTOR.*
ANDREW S. GILL, JR.
BY

*ATTORNEYS*

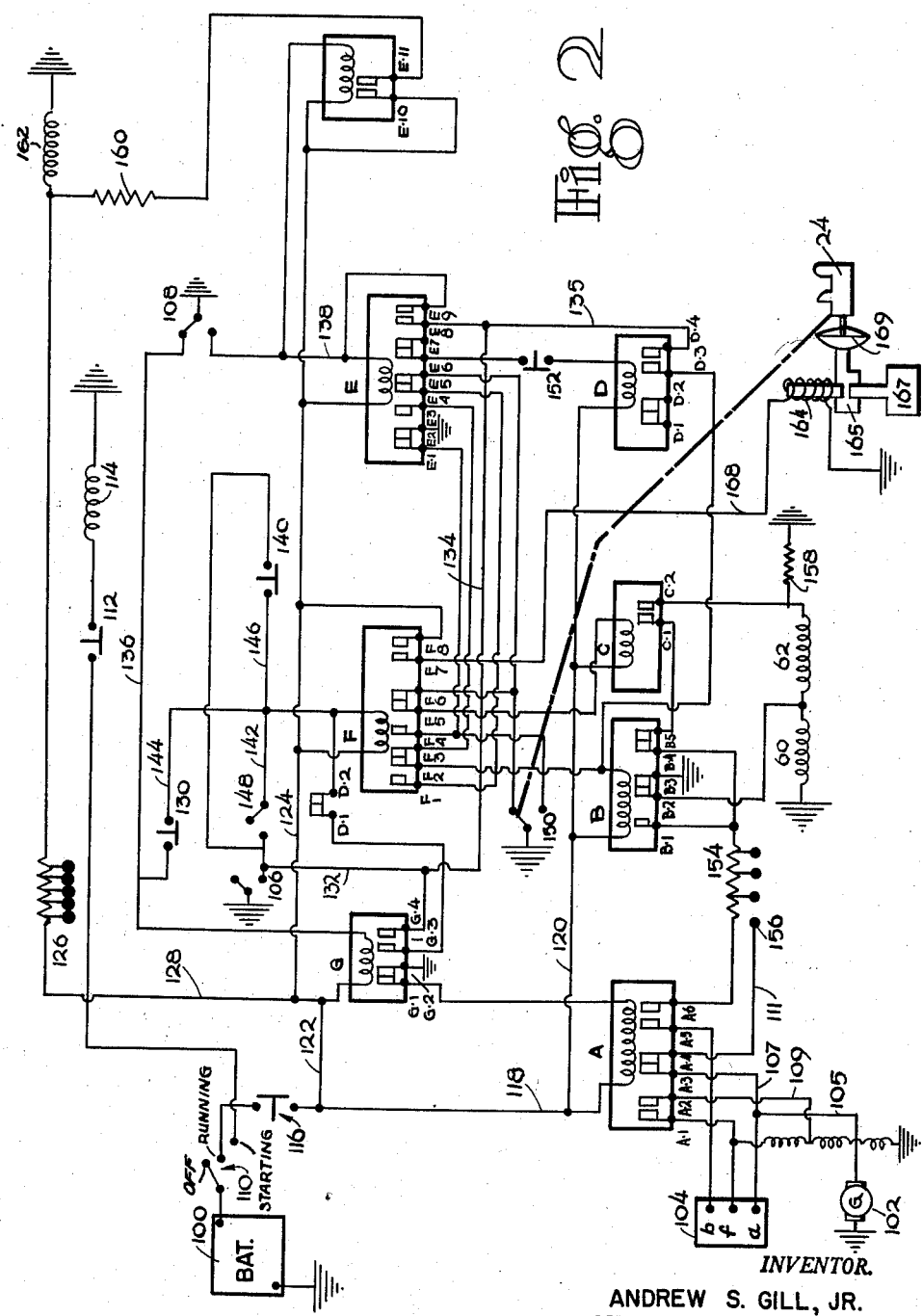

United States Patent Office 2,913,918
Patented Nov. 24, 1959

2,913,918
AUTOMATIC TRANSMISSION AND CONTROL

Andrew S. Gill, Jr., South Euclid, Ohio, assignor to Eaton Manufacturing Company, Cleveland, Ohio, a corporation of Ohio Application August 24, 1954, Serial No. 451,850

10 Claims. (Cl. 74—330)

The present invention relates to transmissions and more particularly to automatically shiftable transmissions and control circuits therefor.

Broadly, the invention comprehends the provision of a control circuit and control elements for a shiftable transmission. A pair of adjustably energizable clutches having a common input member coupled to a power source are controlled in energization by the circuit to provide coupling engagement between a power source and a transmission to shift the same into a plurality of gear ratios, depending upon conditions of operation.

An object of the present invention is to provide an automatic transmission simple in construction and design and employing a minimum number of components.

A further object of the present invention is to provide an automatic transmission comprising in large measure conventional commercially available components so as to minimize the cost thereof.

A further object of the present invention is to provide an automatic transmission for coupling a power source to a load such as in automotive vehicles and the like.

A further object of the present invention is to provide a controllable clutch coupling between a power source and a shiftable transmission.

A further object of the present invention is to provide an electrical control circuit for an automatic transmission that is simple of design and effective to control the operation of the automatic transmission.

A further object of the present invention is to provide a control circuit for a shiftable transmission enabling different sequential orders of automatic upshifting and downshifting of the transmission.

A further object of the present invention is to provide a control circuit for a shiftable transmission enabling throttle manipulable downshifting for accommodating increased loads.

A further object of the present invention is to provide a control circuit for an automatic transmission for controlling the shift points thereof and for delaying the downshift point from high gear.

Other objects and advantages of the invention will appear from the following description taken in connection with the accompanying drawings and in which:

Fig. 1 is a partially cutaway view of the transmission and control clutches employed in the present invention; and Fig. 2 is a schematic diagram of the control circuit for the transmission including the clutches shown in Fig. 1.

The present invention was devised for the purpose of providing a relatively simple, economical and effective arrangement for actuating the shifting mechanism of an automotive transmission so as to provide a smooth, even flow of torque from the engine to the drive wheels of the vehicle. The output member of one of the clutches is connected to a basically conventional synchro-mesh transmission's main shaft for direct drive coupling between the engine or power source and the drive wheels of the vehicle when the clutch is energized for engagement and the output member of the other clutch is connected to a quill rotating about the transmission main shaft and being in geared engagement with the transmission countershaft for driving the load at speeds other than direct drive, including reverse. Energization of the clutches in the proper order by the control circuit automatically provides an optimum transmission gearing from engine to drive wheels for all speeds of the vehicle.

Referring now to Fig. 1 of the drawings for more specific details of the invention, 10 represents generally the transmission employed in the present invention including a section 12 comprising a basically conventional type of synchro-mesh transmission and a section 14 comprising a pair of clutches 16 and 18 designated further as the low speed and high speed clutches, respectively.

In the transmission section 12, a main transmission shaft 20 carries one element 22 of a positive tooth clutch fixedly secured to shaft 20 and having axially slidably mounted thereon another element 24 of the positive tooth clutch for engagement with a synchronizer 26 in its axial movement. Synchronizer 26, being frustum shaped and rotatable with clutch element 24 is adapted for axial movement to engage a frustum-shaped hub 28 which is integral with a second speed follower gear 30, mounted for rotation about shaft 20 but independent thereof in the absence of additional mechanism. At one extreme of the axial movement of clutch element 24, engagement of clutch element 22 with second speed follower gear 30 is effected through the inner teeth on clutch element 24 and teeth 32 integral with follower gear 30. Adjacent to second speed follower gear 30 and mounted for rotation about shaft 20 in a bearing (not shown) is one member 34 of an overrunning clutch 36, the outer member 38 of which is geared for first speed drive. Adjacent to clutch member 34 is a reverse gear 40 splined on shaft 20. Clutch member 34 is toothed at 35 and reverse gear 40 is toothed at 37. Gear 40 is slidable along shaft 20 for selective engagement with clutch member 34 at one axial end and with a driving source for reverse gear at the other axial end.

In transmission section 12 is mounted a countershaft 42 having four gears, 44, 46, 48, and 50 integral therewith for engagement respectively with a geared quill 52 for driving input to the countershaft, second speed follower gear 30, first gear 38 and reverse gear 40, the last mentioned engagement being through a reverse idler gear (not shown) in a well-known manner.

Disposed between section 12 and the engine drive means (not shown) is clutch section 14 having centrally passing therethrough the main transmission shaft 20 carrying for rotation therewith the output member 54 of high speed clutch 18. Quill 52 is mounted concentrically about shaft 20 and output member 56 of low speed clutch 16 is secured to quill 52 for unitary rotation. Clutches 16 and 18 have a common input member 58, driven by the engine output shaft (not shown), and extending proximately and annularly about the periphery of the output members of the clutch and the output members have annular electromagnetic coils 60 and 62 secured thereto for energization to engage the respective clutch output member to the clutch input member. The clutches in section 14 may be of any type but preferably either is of the electromagnetic eddy current or magnetic powder type, in either of which cases energization of the electromagnetic coil effects engagement between the clutch members. For powder clutches, a labyrinth seal arrangement, shown generally at 61, is provided for retaining the powdered material within the clutch housing.

Referring now more particularly to Fig. 2 for a detailed description of the control circuit forming a part of the present invention, A, B, C, D, E, F, and G represent relays, each comprising an electromagnetic coil winding and a plurality of movable armature contacts. Battery 100 represents a conventional electrical storage source, 102 a generator, and 104 a voltage regulator having terminals *b* for battery, *f* for generator field, and *a* for armature—all as employed on conventional automotive vehicles and the like. A three-way "ignition" switch having "off," "start," and "running" positions is shown at 110 and electrically connected to the "start" terminal is a "neutral" switch 112 in series with a starting solenoid 114, one end of which is grounded as, for example, to the automobile frame. Electrically connected to the "running" terminal of switch 110 is a first contact of a second "neutral" switch 116, the other contact of which is connected to a terminal of each of the solenoids of relays A, B, C, D, E, F, and G through line connections to 118, 120, 122, and 124, a terminal of a caterpillar type of variable resistance device 126 through line connection 128 and to a terminal F–8 of relay F. A switch 130 is provided for selective circuit connection between the low voltage sides of the coils of relays F and G and a speed responsive governor switch 106 provides selective electrical connection between ground and contacts G–4, E–8, and D–4 of relays G, E, and F through line connections 132, 134, and 135. A second governor switch 108 selectively provides a ground connection to the low voltage side of the coil of relay G through line 136 to the low voltage side of the coil of relay E through line 138. A parallel arrangement of a "kick-down" switch 148 and a "hill" switch 140 is provided between the junction of one terminal of switch 130 and low voltage terminal of the coil of relay F and the terminal of governor switch 106 that is connected to contact G–4.

A "transmission" switch 150 selectively connects either contact E–5 or F–4 to ground and a switch 152 is actuable to connect the low voltage side of the coil of relay D to contact E–6. A caterpillar type of variable resistance device 154 is connected between contacts A–6 and B–4 and a movable contact 156 of caterpillar 154 is connected to contact A–4 of relay A through line 111.

Energizing coils 60 and 62 of clutches 16 and 18 are shown serially connected between ground and contact C–2 and having the junction between the coils connected to contact B–2. The terminal of coil 62 connected to contact C–2 is grounded through a resistor 158. Contacts E–10 and E–11 of relay E are shown as separated from contacts 1 through 9 of the same relay and as actuated by a separate solenoid coil for clarity, but it should be understood that this separate relay actuating E–10 and E–11 may be incorporated into main relay E with only one solenoid coil and 11 contacts. The contacts E–10 and E–11 of relay E are closable to shunt a resistor 160 across caterpillar 126 in the shift advance circuit of a governor coil 162.

Generator 102 has one armature terminal grounded and the other connected to armature contact terminal *a* of voltage regulator 104 through line connection 105 and to contact A–3 of relay A through line connection 107 and the field of generator 102 is connected between ground and terminal contact *f* on voltage regulator 104 with a connection intermediate the field winding being made to contact A–2 through line connection 109.

The switches 112, 116, 130, 140 and 152 of the control circuit are manipulated by the vehicle operator by a switch control arm carrying a pointer to indicate on a quadrant dial the position of the switches. The several positions of the dial are "R," "N," "D1," "D2," "D3," and "L" for reverse, neutral, drive through second and third gears, drive through first and third gears, drive through first, second, and third gears, and drive through first and second gears only, respectively.

The operation of the present invention will now be described and a consideration of both figures of drawing is had for this purpose. Assuming that the present invention is being employed in an automotive vehicle and that the same is at a standstill with the engine not operating, the engine is started by first placing the quadrant arm in "N" position, which opens switch 116 and closes switch 112 completing the circuit through starting solenoid 114. Switch 110 is actuated to connect the battery 100 to the starting circuit through the starting contact thereof to energize starting solenoid 114 and after the engine is started, switch 110 is placed in position to connect battery B with the "running" contact of the switch. The engine is now operating and the quadrant dial is placed in any desired position depending on desired performance of the automobile and on the road conditions. It is assumed first that it is desired to drive in low range giving a shift between first and second speeds only and that therefore the quadrant switch is actuated to indicate "L" position, closing switches 116 and 140 in Fig. 2. Closure of these switches energizes the solenoid of relay C through lines 118, 120, contacts F–5, F–6, transmission switch 150, ground and battery 100 and energizes the solenoid of relay G through lines 122, 136, switch 108, ground and battery 100 causing the armatures of the respective relays C and G to be actuated and in the case of relay C, the contact between C–1 and C–2 closes the energization circuit of low speed clutch coil 62 through generator 102, line 105, contacts A–3, A–4, line 111, contact 156, caterpillar 154, contacts B–4, B–5, C–1, C–2, coil 62, contacts B–2, B–3 and ground. The electrical connection through caterpillar 154 is effected by connection between contact 156 and further contacts of the caterpillar by opening of the automobile throttle. At this stage of operation the low speed clutch 16 is in engagement and the engine is coupled to the drive wheels through the low speed clutch output member 56, quill 52 integral therewith, countershaft 42, gears 48 and 38, overrunning clutch 36 and main shaft 20 to the differential drive mechanism not shown. Also at this stage, clutch element 24 of the synchro-mesh device is disengaged from synchronizer 26 and teeth 32 such that second speed follower gear 30 is disengaged from shaft 20.

The control circuit remains unchanged in the absence of manual adjustment until governor switch 106 is actuated causing a sequence of events resulting in shift to second speed. The actuation of governor switch 106 is dependent on the speed of the automobile and the energization of governor solenoid 162 through the circuit including caterpillar 126, the resistance of which is controlled by the automobile throttle linkage in a manner disclosed in patent application of Andrew S. Gill, Serial No. 437,245, filed June 16, 1954, now Patent No. 2,870,-648, dated January 27, 1959, to provide a shift advance as operating conditions may demand. The closure of governor switch 106 provides ground connection to the solenoid of relay F, completing its energization circuit through line 146, switch 140, switch 106 and ground, and closing contacts F–3, F–4, and F–7, F–8 of relay F. Actuation of relay F causes energization of the solenoid of relay B by closure of the circuit from the solenoid through contacts F–2, F–1, contacts E–4, E–5 and switch 150 to ground. In response thereto the solenoid 60 of clutch 18 is energized through caterpillar 154, contacts B–1, B–2, the solenoid 60 and ground. The engagement of clutch 18 so that the engine drives the wheels directly causes the engine speed to diminish sufficiently for the shift to second gear. As the proper engine speed is obtained, the shift to second gear is completed since the vacuum shift solenoid is energized through contacts F–7 and F–8 causing shift solenoid 164 to open valve 165 to a source of vacuum 167 and causing movement of sliding clutch element 24 by a vacuum diaphragm 169. Switch 150, actuated by movement of clutch element 24, removes ground from the solenoid of relay B and ground is provided to the low potential side of the solenoid of relay C. Since relay B is deenergized, solenoid 60 is deenergized and solenoid 62 is energized. As the shift to second gear is completed by engagement of sliding clutch element 24 with teeth 32 on follower gear 30 to provide a flow of power through low speed clutch 16, quill 52, gears 44, 46, and 30 and clutch elements 24 and 22 and main shaft 20, all in the order named, a limit switch 150 actuated by sliding clutch element 24 on the transmission is closed to complete the energization circuit for the solenoid of relay C through battery 100, switches 110, 116, lines 118, 120 the solenoid coil, contacts F-4, F-5, switch 150 and ground. Energization of relay C closes contacts C-1 and C-2, completing the circuit of energization for low speed clutch 16 by way of the generator 102, lines 105, 107, contacts A-3, A-4, line 111, contact 156, caterpillar 154 (throttle open), contacts B-4, B-5, contacts C-1, C-2, coil 62 of clutch 16 and ground. The transmission at this stage is in second gear and clutch 16 is engaged only while the throttle is opened providing a circuit through caterpillar 154. Release of the throttle deenergizes the clutch circuit and disengages the load from the engine giving a free-wheeling relation. If the throttle is opened sufficiently to bring the automobile up to a speed sufficient to actuate governor switch 108, the ground connection is removed from the solenoid of relay G deenergizing the same and closing contacts G-1, G-2 thereof. Simultaneously ground connection is provided for the solenoid of relay E energizing the circuit of this solenoid. Closure of contacts G-1, G-2 energizes relay A by way of battery 100, switches 110, 116, line 118, solenoid of relay A, contacts G-1, G-2 and ground. At this stage the coil 62 of clutch 16 is energized even in no throttle position since the circuit of energization from battery terminal b of voltage regulator 104, contacts A-5, A-6, caterpillar 154 etc., now does not include caterpillar contact 156 which is electrically connected only when the throttle is opened. Since the clutch coil 62 is now not deenergized in positions of no throttle, the clutch is engaged in these positions providing coupling between the engine and drive wheels at no throttle and eliminating the free-wheeling condition existent when switch 108 is not actuated. That is, actuation of switch 108 in response to sufficient load speed causes a series of events resulting in elimination of free-wheeling in the automobile.

It is noted that actuation of switch 108 closes the energization circuit of relay E, closing contacts E-8, E-9 and E-10, E-11. Contacts E-8, E-9 provide ground for the solenoid coil of this relay resulting in its energization even after switch 108 returns to its low speed or unactuated position and contacts E-10, E-11 introduce resistor 160 in parallel with governor caterpillar 126 providing greater excitation for governor solenoid 162.

Reduction in speed of the automobile causes switches 108 and 106 to return to their normal unactuated positions in a reverse order of their actuation causing deenergization of solenoids of relays A, C, E, and F and energization of relay G resulting in deenergization of the coil 62 of clutch 16. The engine becomes disengaged from the load and the automobile free wheels.

Assuming now that it is desired to operate the automobile in the D-2 range or in other words to start in second gear and shift to third after attaining sufficient speed. Manipulation of the quadrant indicator to provide operation in this range closes switch 130 to provide a ground connection for the solenoid of relay F and to energize the same. Energization of relay F causes connection between contacts F-3, F-4 and between F-7, F-8, closing the circuit of energization of the solenoid of relay C and vacuum solenoid 164 causing the transmission to be shifted to second gear. Transmission switch 150 is closed by movement of the transmission sliding clutch element 24 and an energization path from battery 100, switches 110, 116, lines 118, 120, solenoid of relay C, contacts F-5, F-6, and switch 150 and ground is closed. The energization circuit of low speed clutch coil 62 as above described is thereby closed. Additionally, governor solenoid 162 is energized through caterpillar 126 to provide actuation of governor switches 106 and 108 in response to sufficient load speeds. Relay G is energized by virtue of the closed path from the solenoid thereof to ground through switch 108. As the speed of the vehicle is increased and the point of actuation of governor switch 106 is attained, switch 106 connects ground to the low potential side of the solenoid of relay F through contacts D-1, D-2, G-3, G-4, line 132 and switch 106. No change is produced in the transmission or clutches at this point. When additional speed is attained, governor switch 108 is closed providing ground connection to the low potential side of the solenoid of relay E and removing ground from the low potential side of the solenoid of relay G. Relays F and G are deenergized since contacts G-3, G-4 are opened and since switch 108 is opened. Vacuum solenoid 164 is deenergized and sliding clutch element 24 is returned to its disengaged position and consequently switch 150 also is returned to its unactuated position. The circuit now provides for operation in third gear since relay B is actuated by virtue of energization through a closed circuit for the solenoid of relay B. The circuit of energization includes battery 100, switches 110, 116, lines 118, 120, solenoid of relay B, contacts F-2, F-3, contacts E-3, E-2 and ground. Relay C remains actuated since ground connection to the low potential side of its solenoid is provided through switch 150 and at this time high speed clutch 18 is engaged since the solenoid thereof is energized through a closed path including b terminal of voltage regulator 104, contacts A-5, A-6, caterpillar 154, contacts B-1, B-2, solenoid 60 of clutch 18 and ground. The drive at this stage is directly from the engine through the main transmission shaft to the drive wheels. Governor solenoid 162 receives current through caterpillar 126 and through resistor 160 in parallel with caterpillar 126 through the connection provided by contacts E-10, E-11. The parallel connected resistor 160 is provided in third gear to increase the governor solenoid excitation so as to prevent frequent and disturbing shifting from third gear to second. After the shift from second to third gear, the increased excitation through the parallel path requires a greater reduction in speed to shift down to second than would be the case without the parallel connected resistor. As an example only, the upshift from second to third without the parallel connected resistor may take place at 45 m.p.h. and the downshift in response to decreased speed with throttle still open will take place at 35 m.p.h. But employing the parallel connected resistor, the upshift to third again takes place at 45 m.p.h. but the downshift to second may take place at 20 m.p.h. with the throttle open. If no throttle is applied, the downshift will take place at a lower speed since caterpillar current is increased thereby increasing the total current in governor solenoid 162. Sufficient reduction in speed of the automobile due to decreased throttle releases switch 108 to deenergize the solenoids of relays E and A and to energize solenoids of relays G and F to establish circuit connections for second gear and a greater reduction in speed removes the ground connection provided by switch 106 to return the system to first gear.

Assuming now that it is desired to operate in the D-3 range or in other words to shift from first to second and then to third gear, the quadrant selector switch is placed in D-3 position in which case all of the switches 130, 140, 148, and 152 are maintained opened. At this stage, the solenoids of relays C and G are energized since governor switch 108 is positioned to provide a ground connection to the low potential side thereof. Clutch 16 is engaged since the solenoid thereof is energized through caterpillar 154, contacts B-4, B-5, contacts C-1, C-2, the solenoid 62, contacts B-2, B-3 and ground. After sufficient speed is attained in first gear, governor switch 106 is actuated and the circuit of energization for the solenoid of relay F is completed through line 132, contacts G–3, G–4, line 136 and ground and the circuit of energization of the solenoid of relay B is completed through contacts F–2, F–1, contacts E–4, E–5 and switch 150 and the respective relays B and F are actuated. In response thereto the solenoid 60 of high speed clutch 18 is energized through the clutch caterpillar 154, contacts B–1, B–2, the solenoid 60 of clutch 18 and ground. The engagement of the high speed clutch so that the engine drives the wheels directly causes the engine speed to be diminished sufficiently for the engagement of the high speed clutch so that the engine drives the wheels directly causes the engine speed to be diminished sufficiently for the engagement of the engine to the drive wheels through the transmission second gear. As the appropriate engine speed is obtained, the shift to second gear is completed since the vacuum shift solenoid is energized through contacts F–7 and F–8. Switch 150 actuated by the second speed sliding gear removes ground connection from the low potential side of the solenoid of relay B and ground connection is provided to the low potential side of the solenoid of relay C in addition to the ground path through contacts E–1 and E–2. Since relay B is deenergized, the high speed clutch solenoid is also deenergized and the low speed clutch solenoid is in turn energized. At this stage, the automobile is operating in second gear in a manner described above. In response to sufficient increase of speed, governor switch 108 is actuated and through a series of events the shift to third gear is made in a manner already described in connection with operation of the automobile in D–2 range.

It is next assumed that it is desired to operate the automobile in the D–1 range or in other words a shift from first gear directly to third gear. In this instance the quadrant indicator is manipulated to D–1 position and in response thereto, switch 152 is closed providing energization for the solenoid of relay D by way of connections from battery 100 through switches 110, 116, lines 118, 120, the solenoid of relay D, switch 152, contacts E–6, E–7 and ground. After a start from standstill the transmission is in first gear as previously described with low speed clutch 16 engaged until sufficient speed is attained to close governor switch 106 at which time the solenoid of relay B is energized by virtue of the ground connection to the low potential side of this solenoid through contacts D–3, D–4, lines 136, 134, switch 106 and ground. Energization of solenoid 62 of low speed clutch 16 is terminated and energization of solenoid 60 of high speed clutch 18 is provided since contacts B–4, B–5 are opened and contacts B–1, B–2 are closed. When the speed of the automobile is increased so as to actuate governor switch 108, relay E is actuated and the condition of the circuit is in normal third gear as described above in connection with operation in D–2 or D–3 range.

It is now assumed that it is desired to drive the automobile in a reverse direction. The selector arm is manipulated so as to direct the indicator pointer to "R" or reverse. Reverse gear 40 is moved rearwardly to engagement with a reverse idler gear (not shown) which also engages and is driven by gear 50 on countershaft 42. Increased throttle provides low speed clutch solenoid 62 with energizing current to provide engagement of low speed clutch 16 to drive the countershaft 42 and main shaft 20 in a reverse direction.

It is next assumed that the automobile is being operated in normal third gear and that an unusual load is imposed upon the engine as, for example, that a steep hill is approached or that it is desired to pass another automobile in a short duration of time. In this case, advantage may be taken of the "kick down" or "hill" feature incorporated in the transmission control circuit whereby a shift is made from third gear to second in response to full throttle. In normal third gear, relays B, C, and E are energized, switches 106 and 108 are actu- ated and the high speed clutch solenoid 18 is energized. Assuming, therefore, that it is desired to surmount a steep hill or to pass another vehicle, either "kick down" switch 148 or "hill" switch 140 is closed by appropriate manipulation of the operator and a ground connection is provided to the low potential side of the solenoid of relay F. Immediately positive potential is applied to vacuum shift solenoid 164 and the circuit thereof is closed to actuate the transmission sliding gear and effect a shift to second gear. Following the actuation of relay F, both solenoids of relays B and C are deenergized and consequently both clutch solenoids 60 and 62 are deenergized to disengage the engine from the drive wheels. When the proper engine speed is attained, sliding clutch element 24 causes a shift to second gear and switch 150 is actuated to energize the low speed clutch solenoid in a manner previously described to provide engagement of the engine with the drive wheels. After the "kick down" feature is employed and the throttle is released and if the governor switch is actuated, the transmission shifts back to third gear as before the "kick down."

It is next assumed that in the operation of the automobile that load conditions while driving in second gear cause a reduction in speed so great that operation in first gear would be most appropriate and that governor switch 106 in response to the speed change is released or opened. This opens the circuits of energization of the solenoids of relays E and F causing these relays to be released and since transmission switch 150 is actuated, the solenoid of relay C is also released rendering both clutch coils 60 and 62 deenergized since both relays B and C are deenergized. Shift solenoid 164 having been deenergized by the release of relay F, the shift to first gear takes place by the action of a spring (not shown) for returning sliding clutch element 24 to its unactuated or first gear position and switch 150 is consequently returned to its unactuated position. Return of switch 150 to its unactuated position closes the circuit of energization for the solenoid of relay C resulting in energization of low speed clutch solenoid 62 to complete the shift to first gear. Sufficient increase in speed subsequent to this condition of operation causes a shift to second and third gears in a manner already explained.

It is to be understood that the plural speed transmission control circuit may be employed for the control of many transmission systems of the type having a pair of clutches and a plural speed gearing mechanism and that it is not limited in control only to the arrangement described and shown. It is equally to be understood that the transmission system disclosed comprising a pair of clutches and a plural speed gearing mechanism is adaptable for operation in other control systems.

It is further to be understood that the control circuit and transmission mechanism both shown and described are exemplary only and that each is susceptible of many modifications without departing from the scope of the invention.

What I claim is.

1. In a plural speed transmission for coupling a power source to a load comprising a clutch having an input member and a pair of selectively engageable output members, a gear box having a main shaft and a countershaft, said main shaft being coupled to one of said output members and said countershaft being coupled to the other of said output members, an overrunning clutch having a driven member connected to said main shaft and a driving member concentric with said driven member, said countershaft having a first gear rotatable therewith and engageable with said driving member, a second gear rotatable with said countershaft and a follower gear mounted on said main shaft and engageable with said second gear, a slidable clutch member movable axially along said main shaft engageable with said follower gear and coupled to said main shaft whereby three different ratios of coupling are selectively provided between a power source and a load.

2. In a plural speed coupling means for coupling a power source to a load comprising a clutch input member coupled to said power source and a pair of clutch output members selectively engageable with said input member, a gear box including speed reducing gear means and a sliding positive tooth clutch element connected intermediate one of the output members and the load through said speed reducing gear means, means connecting the other of said output members directly to the load, said sliding clutch element being actuable to selectively provide a predetermined speed, a control circuit, means controlled by said control circuit for selectively coupling said clutch output members to said clutch input member and actuating means controlled by said control circuit to effect a movement of said sliding clutch element in response to load speed to provide a plural speed automatically shiftable transmission.

3. A control circuit for a plural speed transmission having a clutch input member and a pair of clutch output members, a power source coupled to said input member and a load selectively coupled to said output members, a pair of energizable clutch coils for providing magnetic flux linking said input member with said output members, a vacuum shift solenoid for controlling means for providing a shift in said transmission, said control circuit having a pair of relays each including a relay solenoid and a plurality of actuable armature contacts responsive to energization of the relay solenoid, said clutch coils being coupled to said contacts and to ground, further relays having solenoids and actuable armature contacts, and speed responsive governor switches sequentially actuated in response to load speed, said further relays being energizable by said governor switches and having contacts coupled to the solenoids of said pair of relays to control the actuation of said pair of relays, said shifting solenoid and said clutches whereby a control for selective energization of said clutch coils and shifting solenoid is provided.

4. A control circuit for a plural speed transmission having a clutch input member and a pair of clutch output members, a power source coupled to said input member and a load selectively coupled to said output members, a pair of electromagnetic clutch coils associated with each of said clutch output members, a source of electrical energy and first, second, and third relays each having a solenoid and engageable armature contacts actuable by excitation of said solenoid, a variable resistance device, said energy source being connected to said clutch coils through said variable resistance device and the contacts on said relays, further relays each having a solenoid and engageable armature contacts actuable by excitation of its solenoid for controlling the excitation of the solenoids of said first, second, and third relays and governor switches sequentially actuated in response to the speed of said load for controlling the excitation circuit of the solenoids of said further relays whereby actuation of said clutches is controlled by the speed of said load.

5. In a plural speed transmission comprising a power source and a load, means coupling said power source to said load including a high speed clutch, a low speed clutch and a plural ratio shift means, means coupling said high speed clutch directly to said load and means coupling said low speed clutch to said load through said plural ratio shift means, a speed responsive governor switch driven by said load and connected for alternately engaging said clutches, a gear in said plural gear ratio shift means slidable for changing the gear ratio of said shift means in response to closure of said governor switch whereby said governor switch is actuated at a predetermined speed to engage said high speed clutch and to disengage said low speed clutch and to change the gear ratio of said shift means to provide a control for an automatically shiftable transmission.

6. A control circuit for a plural speed transmission comprising a pair of governor switches, a pair of serially connected clutch coils, a transmission gear speed change shifting solenoid and a plurality of relays each having an energizable solenoid with one end connected to one terminal of a direct voltage supply and a plural set of armature contacts actuable by energization of said solenoid, first and second and third of said relays having contacts interconnected and connected to said clutch coils and a direct voltage supply for selectively energizing said coils, further relays having contacts interconnected and switch means being manually manipulable and having one terminal connected to the other ends of said solenoids and a second terminal connectable to ground through said governor switches for selective energization of said further relays, said shifting solenoid being connected for energization through contacts of one of said further relays in response to energization of said relay, said governor switches being actuable in sequence in response to speed of said load.

7. A control circuit for a plural speed transmission comprising a pair of electromagnetic clutches each having a clutch coil, a power source and a load being coupled through said transmission, a pair of governor switches actuable in sequence in response to the speed of said load, a transmission switch, a vacuum solenoid and a gear box having a sliding positive tooth clutch element therein, means controlled by said vacuum solenoid for actuating said sliding clutch element and actuating said transmission switch, a plurality of relays each comprising a relay solenoid and a plurality of sets of engageable contact armatures responsive to energization of said relay solenoid, and a plurality of switches manually and alternately manipulable for completing energization circuits for said relay solenoids to provide selective energization for said clutch coils and said vacuum shift solenoid.

8. A control circuit for a plural speed transmission including a pair of clutches each having an energizable clutch coil associated therewith, a vacuum shift solenoid, a positive tooth clutch element box having a sliding gear therein controlled by means actuated by said solenoid and a transmission switch actuated by the movement of said sliding clutch element, a load and a power source for driving said load through said transmission, a pair of governor switches sequentially actuable in response to the speed of said load and each having one terminal thereof grounded and each having a pair of further terminals, a plurality of relays each having a relay solenoid and a plurality of sets of armature contacts responsive to energization of said relay solenoid to alter a circuit condition, a first and a second source of direct voltage, and a variable resistance device, a first of said relays having a pair of contact sets actuable to selectively connect one of said voltage sources to said variable resistance device, a second relay of said plurality having a plurality of sets of armature contacts and a third relay of said plurality having a set of armature contacts, said second and third relays being actuable to connect said variable resistance device to a selected one of said clutch coils, the actuating means for said second and third relays including further relays, said governor switches and said transmission switch, a first relay of said further relays having a pair of sets of contacts for controlling energization of said first relay and a second relay of said further relays, the energization circuit of said first relay of said further relays being completed by connection to a further contact of one of said governor switches, a second of said further relays being selectively energizable through circuit means including a set of contacts on said first further relay and the other of said governor switches and through a manually actuable switch means, whereby the actuation of the other governor switch and said manually actuable switch means causes energization of said second further relay and a consequent energization of said solenoid shift coil, actuation of said sliding clutch element and transmission switch to energize said third relay providing energization to one of said clutch coils.

9. A control circuit for a plural speed transmission including a pair of clutches each having an energizable clutch coil associated therewith, a load and a power source being coupled through said transmission, a pair of governor switches sequentially actuable in response to the speed of said load and each having a pair of contacts selectively grounded by actuation therof, a first, second, and third relays each having engageable armature contacts and a solenoid for actuating said contacts, means actuating said relays to selectively provide energization to said clutch coils, said means including first, second, and third further relays each having engageable armature contacts and a solenoid energizable to actuate said contacts, a voltage source connected to one terminal of each of the solenoids of said further relays, said first further relay being energized by actuation of one of said governor switches to deenergize said second further relay, said third further relay being deenergized by actuation of said one governor switch, and switch means in the solenoid circuit of said second circuit manually actuable to deenergize said solenoid.

10. A control circuit for a plural speed transmisison including a pair of clutches each having an energizable clutch coil associated therewith, a vacuum shift solenoid, a gear box having a sliding positive tooth clutch element actuated by means controlled by said shift solenoid and a transmission switch actuated by the movement of said sliding gear, a load and a power source being coupled through said transmission, a governor switch actuable in response to the speed of said load and having a pair of contacts selectively grounded by actuation thereof, first, second, and third relays each having engageable armature contacts and a solenoid for actuating said contacts, means actuating said relays and said sliding clutch element selectively to provide energization of said clutch coils, said means including first and second further relays each having armature contacts and a solenoid for the actuation of said armature contacts, a direct voltage source connecting one terminal of each of said relays and said further relays, and manually operable switch means having one terminal connected to the other terminal of the solenoid of said first further relay, said switch having a second terminal connected to one of the terminals of said governor switch and to the other terminal of the solenoid of said second further delay, said vacuum solenoid being connected to said direct voltage source through contacts on said first further relay, said transmission switch being in circuit with said third relay solenoid, whereby one of said clutches is engaged and said other of said clutches is disengaged in response to the actuation of said governor switch and deenergization of said shift solenoid.

References Cited in the file of this patent

UNITED STATES PATENTS

| | | |
|---|---|---|
| 2,100,810 | Livermore | Nov. 30, 1937 |
| 2,282,591 | Orr | May 12, 1942 |
| 2,376,545 | Livermore | May 22, 1945 |
| 2,386,540 | Campodonico | Oct. 9, 1945 |
| 2,548,756 | Winther | Apr. 10, 1951 |
| 2,582,220 | Beckwith | Jan. 15, 1952 |
| 2,605,650 | Winther et al. | Aug. 5, 1952 |
| 2,733,613 | Kreis | Feb. 7, 1956 |

UNITED STATES PATENT OFFICE
CERTIFICATE OF CORRECTION

Patent No. 2,913,918                          November 24, 1959

Andrew S. Gill, Jr.

It is hereby certified that error appears in the printed specification of the above numbered patent requiring correction and that the said Letters Patent should read as corrected below.

Column 7, lines 11, 12 and 13, strike out "engagement of the high speed clutch so that the engine drives the wheels directly causes the engine speed to be diminished sufficiently for the".

Signed and sealed this 13th day of September 1960.

(SEAL)
Attest:
KARL H. AXLINE                                ROBERT C. WATSON
Attesting Officer                            Commissioner of Patents